United States Patent
Yang et al.

(10) Patent No.: US 11,021,637 B2
(45) Date of Patent: Jun. 1, 2021

(54) ADHESIVE FOR FLEXIBLE OPTICAL FILM

(71) Applicant: BenQ Materials Corporation, Taoyuan (TW)

(72) Inventors: Wen-Hsin Yang, Taoyuan (TW); Hung-Jiun Shieh, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 203 days.

(21) Appl. No.: 16/417,702

(22) Filed: May 21, 2019

(65) Prior Publication Data

US 2020/0199419 A1  Jun. 25, 2020

(30) Foreign Application Priority Data

Dec. 24, 2018 (TW) .................... 107146747

(51) Int. Cl.

| | |
|---|---|
| *C09J 133/10* | (2006.01) |
| *C08F 220/12* | (2006.01) |
| *C08F 220/20* | (2006.01) |
| *C08L 33/14* | (2006.01) |
| *C08F 220/16* | (2006.01) |
| *C08L 33/08* | (2006.01) |
| *C09J 133/08* | (2006.01) |
| *C09J 133/06* | (2006.01) |
| *C08L 33/06* | (2006.01) |
| *C09J 133/14* | (2006.01) |
| *C08L 33/10* | (2006.01) |

(52) U.S. Cl.
CPC ........... *C09J 133/10* (2013.01); *C08F 220/12* (2013.01); *C08F 220/16* (2013.01); *C08F 220/20* (2013.01); *C08L 33/06* (2013.01); *C08L 33/08* (2013.01); *C08L 33/10* (2013.01); *C08L 33/14* (2013.01); *C09J 133/066* (2013.01); *C09J 133/08* (2013.01); *C09J 133/14* (2013.01); *C09J 2301/30* (2020.08); *C09J 2301/312* (2020.08)

(58) Field of Classification Search
None
See application file for complete search history.

(56) References Cited

FOREIGN PATENT DOCUMENTS

JP           2014152319 A  *  8/2014

* cited by examiner

*Primary Examiner* — Richard A Huhn

(57) ABSTRACT

An adhesive for a flexible optical film, especially an acrylate pressure-sensitive adhesive for a flexible display device is disclosed. The shear storage modulus ($G'_{(60°\ C./0.1\ Hz)}$) at the temperature of 60° C. and the frequency of 0.1 Hz and the shear storage modulus ($G'_{(30°\ C./1\ Hz)}$) at the temperature of 30° C. and the frequency of 1 Hz of the present acrylate pressure-sensitive adhesive satisfy the relation: ($G'_{(60°\ C./0.1\ Hz)} - G'_{(30°\ C./1\ Hz)})/G'_{(30°\ C./1\ Hz)} > -0.29$, and the loss tangent (tan $\delta_{(60°\ C./0.1\ Hz)}$) at the temperature of 60° C. and the frequency of 0.1 Hz and the loss tangent (tan $\delta_{(30°\ C./1\ Hz)}$) at the temperature of 30° C. and the frequency of 1 Hz of the present acrylate pressure-sensitive adhesive satisfy the relation: (tan $\delta_{(60°\ C./0.1\ Hz)}$ - tan $\delta_{(30°\ C./1\ Hz)}$)/tan $\delta_{(30°\ C./1\ Hz)} < 0.2$.

6 Claims, No Drawings

ADHESIVE FOR FLEXIBLE OPTICAL FILM

RELATED APPLICATIONS

This application claims priority to Taiwan Application Serial Number 107146747 filed on Dec. 24, 2018, which is herein incorporated by reference.

BACKGROUND OF THE INVENTION

Field of the Invention

The invention relates to an adhesive for a flexible optical film, and more particularly to an acrylate pressure sensitive adhesive for a flexible display device.

Description of the Related Art

With advances in display technology, displays have developed from early cathode ray tube (CRT) displays to current flat panel displays (FPD). Compared with the flat display formed of a rigid substrate, such as a glass substrate, the flexible display device made of a plastic substrate or a thin metal plate can have characteristics such as flexibility and impact resistance, and therefore, the flexible display device can be curled or folded and stored when not in use, so as to facilitate to be carried. In addition, the flexible display device can also be easily mounted on a non-planar surface to create a different visual experience. Therefore, it is expected that the flexible display device will become a market trend in the future.

Since the flexible display device is generally a composite structure of various laminated film layers, for example, a surface functional layer, an anti-reflection layer, a barrier layer, a display layer, an electrode layer, a substrate layer, etc., the adhesives are often required for laminating assembly between the heterogeneous film layers. However, because the materials and the modulus of the various film layers are not the same, the degrees of stress that the various film layers can be withstood during the simultaneous bending and folding process are different. Therefore, in addition to the problem that each material itself must overcome the stress fracture, the adhesives between the film layers need to have a certain sustained release and absorption effect for stress, and the sufficient adhesiveness and filling property are required between the film layers at the same time to make the film layers not to be peeled to cause the damage of the flexible display device after being stressed.

In addition, in the application context of the flexible display device, in addition to a dynamic situation in which the user unfolds the flexible display device from the folded storage state to use, a static storage situation in which the flexible display device maintains a bent and folded storage state is usually more. Because the film layers or adhesives in the flexible display device are in a state of continuous long-term stress during folding and storage, the static storage situation for the flexible display device is more stringent. In particular, the adhesive itself is not a solid material, and a pressure sensitive adhesive having a viscoelastic property is usually applied, so that it is easy to creep after a long time of stress opposite to film layers, and the appearance or optical performance of the flexible display device will be destroyed because of the permanent irreversible deformation. Thus, when the flexible display device is unfolded to a theoretically flat state, the surface of the flexible display device may not be in a real flat state and exhibit a curled state or may be deformed at the folding interface. In addition, when the flexible display device is repeatedly dynamic folding or folded for a long time, and the adhesive is damaged due to creep to cause the peeling force or the filling property less than the original design value, the film layers in the flexible display device may be peeled off.

Accordingly, there is a need for an adhesive for a flexible optical film, and more particularly to an acrylate pressure sensitive adhesive for a flexible display device that provides flexibility in dynamic folding situation or good bending restoring property, adhesiveness, and no creep problems in long time folding storage. The flexible display device can be restored to a flat state after being repeated folded or folded for a long time. Further, the adhesive for a flexible display device of the present invention can also provide the necessary adhesiveness to avoid the problem of peeling between film layers.

SUMMARY OF THE INVENTION

The object of the present invention is to provide an adhesive for a flexible optical film, and more particularly to an acrylate pressure sensitive adhesive for a flexible display device. The adhesive can provide good flexibility without creep problems and has excellent adhesiveness.

In an aspect of the adhesive of present invention, the adhesive for a flexible optical film has a shear storage modulus ($G'_{(60° C./0.1 Hz)}$) measured at the temperature of 60° C. and the frequency of 0.1 Hz and a shear storage modulus ($G'_{(30° C./1 Hz)}$) measured at the temperature of 30° C. and the frequency of 1 Hz, wherein the shear storage modulus ($G'_{(60° C./0.1 Hz)}$) and the shear storage modulus ($G'_{(30° C./1 Hz)}$) satisfy the relation: ($G'_{(60° C./0.1 Hz)} - G'_{(30° C./1 Hz)})/G'_{(30° C./1 Hz)} > 0.29$, and has a loss tangent (tan $\delta_{(60° C./0.1 Hz)}$) measured at the temperature of 60° C. and the frequency of 0.1 Hz and a loss tangent (tan $\delta_{(30° C./1.0 Hz)}$) measured at the temperature of 30° C. and the frequency of 1 Hz, wherein the loss tangent (tan $\delta_{(60° C./0.1 Hz)}$) and the loss tangent (tan $\delta_{(30° C./1 Hz)}$) satisfy the relation: (tan $\delta_{(60° C./0.1 Hz)} -$ tan $\delta_{(30° C./1 Hz)})/$tan $\delta_{(30° C./1 Hz)} < 0.2$.

In another aspect of the adhesive of present invention, the shear storage modulus ($G'_{(60° C./0.1 Hz)}$) measured at the temperature of 60° C. and the frequency of 0.1 Hz is ranging from 0.05 □Mpa to 0.09 Mpa, and the shear storage modulus ($G'_{(30° C./1 Hz)}$) measured at the temperature of 30° C. and the frequency of 1 Hz is ranging from 0.07 □Mpa to 0.15 Mpa.

In another aspect of the adhesive of present invention, the loss tangent (tan $\delta_{(60° C./0.1 Hz)}$) measured at the temperature of 60° C. and the frequency of 0.1 Hz is ranging from 0.08 to 0.15, and the loss tangent (tan $\delta_{(30° C./1 Hz)}$) measured at the temperature of 30° C. and the frequency of 1 Hz is ranging from 0.09 to 0.12.

In another aspect of the adhesive of present invention, the adhesive comprises at least a (meth)acrylate polymer, a hardener, and a silane coupling agent.

In another aspect of the adhesive of present invention, the (meth)acrylate polymer includes an alkyl (meth)acrylate, an aromatic (meth)acrylate, and a hydroxyl monomer.

In another aspect of the adhesive of present invention, the number average molecular weight (Mn) of the (meth)acrylate polymer is ranging between 1500000 and 2500000, and the glass transition temperature (Tg) is ranging between −30° C. and −35° C.

In another aspect of the adhesive of present invention, the adhesive further comprises an addition agent selected from one of the group consisting of an antistatic agent, an UV absorbent, a low molecular weight polymer, a plasticizer, a filler, a colorant and a pigment, or combinations thereof.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

The conventional testing method for the flexibility of the flexible display device is a dynamic folding test with a fixed folding frequency at room temperature, but this method cannot really reflect the restoring property of the flexible display device after being statically folding stored for a long time. Therefore, the present invention measures the deformation curling height of a composite film with the adhesive after the dynamic folding test and the static folding test, and respectively measures the rheological properties of the adhesive at 30° C., 1 Hz, and at 60° C., 0.1 Hz to obtain an adhesive for the flexible display device that can simultaneously meet the requirements of dynamic folding and static folding storage. Because the acrylate pressure-sensitive adhesive is a polymer material, a mechanical phenomenon equivalent to rapid dynamic folding can be obtained at a lower temperature and a higher frequency, and a polymer creep behavior equivalent to a long time static folding storage effect can be obtained at a higher temperature and a lower frequency. Therefore, the present invention provides an adhesive for the flexible optical film, particularly an acrylate pressure-sensitive adhesive for the flexible display device, which is suitable for adhering to flexible substrates, and maintains well adhesiveness after folding of 200,000 times. In an aspect of the adhesive of present invention, the adhesive for the flexible optical film has a shear storage modulus ($G'_{(60°\ C./0.1\ Hz)}$) measured at the temperature of 60° C. and the frequency of 0.1 Hz and a shear storage modulus ($G'_{(30°\ C./1\ Hz)}$) measured at the temperature of 30° C. and the frequency of 1 Hz, wherein the shear storage modulus ($G'_{(60°\ C./0.1\ Hz)}$) and the shear storage modulus ($G'_{(30°\ C./1\ Hz)}$) satisfy the relation: ($G'_{(60°\ C./0.1\ Hz)} - G'_{(30°\ C./1\ Hz)})/G'_{(30°\ C./1\ Hz)} > -0.29$, and has a loss tangent ($\tan \delta_{(60°\ C./0.1\ Hz)}$) measured at the temperature of 60° C. and the frequency of 0.1 Hz and a loss tangent ($\tan \delta_{(30°\ C./1\ Hz)}$) measured at the temperature of 30° C. and the frequency of 1 Hz, wherein the loss tangent ($\tan \delta_{(60°\ C./0.1\ Hz)}$) and the loss tangent ($\tan \delta_{(30°\ C./1\ Hz)}$) satisfy the relation: ($\tan \delta_{(60°\ C./0.1\ Hz)} - \tan \delta_{(30°\ C./1\ Hz)})/(\tan \delta_{(30°\ C./1\ Hz)}) < 0.2$. When the rate of change of the shear storage modulus and the rate of change of the loss factor satisfy the above relationship, the acrylate pressure-sensitive adhesive of the present invention can simultaneously have excellent dynamic folding and static folding storage properties when applied to flexible substrates.

In another aspect of the adhesive of present invention, the shear storage modulus ($G'_{(60°\ C./0.1\ Hz)}$) measured at the temperature of 60° C. and the frequency of 0.1 Hz is ranging from 0.05 Mpa to 0.09 Mpa, and the shear storage modulus ($G'_{(30°\ C./1\ Hz)}$) measured at the temperature of 30° C. and the frequency of 1 Hz is ranging from 0.07 Mpa to 0.15 Mpa.

In another aspect of the adhesive of present invention, the loss tangent ($\tan \delta_{(60°\ C./0.1\ Hz)}$) measured at the temperature of 60° C. and the frequency of 0.1 Hz is ranging from 0.08 to 0.15, and the loss tangent ($\tan \delta_{(30°\ C./1\ Hz)}$) measured at the temperature of 30° C. and the frequency of 1 Hz is ranging from 0.09 to 0.12.

In another aspect of the adhesive of present invention, the adhesive comprises at least a (meth)acrylate polymer, a hardener, and a silane coupling agent.

In another aspect of the adhesive of present invention, the amount of the hardener is ranging from 0.05 parts by weight to 0.6 parts by weight relative to per 100 parts by weight of (meth)acrylate polymer, and the amount of the silane coupling agent is ranging from 0.05 parts by weight to 1.1 parts by weight. The hardener can provide crosslink strength, and the silane coupling agent can adjust the extensibility to meet the requirements of dynamic folding and static folding storage.

In another aspect of the adhesive of present invention, the (meth)acrylate polymer includes an alkyl (meth)acrylate, an aromatic (meth)acrylate, and a hydroxyl monomer.

The alkyl (meth)acrylate suitable for the present adhesive may comprise an alkyl (meth)acrylate monomer having an alkyl group of 1 to 14 carbon atoms, which can be selected but not limited from at least one of the group consisting of methyl (meth)acrylate, ethyl (meth)acrylate, n-propyl (meth)acrylate, isopropyl (meth)acrylate, n-butyl (meth)acrylate, tert-butyl (meth)acrylate, sec-butyl (meth)acrylate, pentyl (meth)acrylate, 2-ethylhexyl (meth)acrylate, n-octyl (meth)acrylate, isooctyl acrylate, isodecyl (meth)acrylate, lauryl (meth)acrylate, and tetradecyl (meth)acrylate, or combinations thereof.

The aromatic (meth)acrylate suitable for the present adhesive is a compound having an aromatic ring structure and containing a methacryloyl group in its structure. The aromatic ring may, for example, comprise a benzene ring, a naphthalene ring or a biphenyl ring. The aromatic (meth)acrylate can be selected from one of the group consisting of phenyl (meth)acrylate, phenoxy (meth)acrylate, 2-phenoxyethyl (meth)acrylate, phenoxypropyl (meth)acrylate, ethoxylated 2-phenoxyethyl (meth)acrylate, 2-hydroxy-3-phenoxypropyl (meth)acrylate, tolyl (meth)acrylate, and polystyryl (meth)acrylate, or combinations thereof.

The hydroxyl monomer suitable for the present adhesive can be selected but not limited from at least one of the group consisting of 2-hydroxyethyl (meth)acrylate, 2-hydroxypropyl (meth)acrylate, 4-hydroxybutyl (meth)acrylate, 2-hydroxyethyl (meth)acrylate, and 2-hydroxypropanediol (meth)acrylate, or combinations thereof.

In another aspect of the adhesive of present invention, the (meth)acrylate polymer has a number average molecular weight (Mn) ranging between 1500000 and 2500000, and more preferably ranging between 1700000 and 2300000, and a glass transition temperature (Tg) ranging between −25° C. and −45° C., and more preferably ranging between −30° C. and −35° C.

The hardener suitable for the present adhesive can be selected from at least one of the group consisting of toluene diisocyanate (TDI)-trimethylolpropane (TMP) adduct, toluene diisocyanate trimer (TDI trimer), a metal chelate compound, and an epoxy compound, or combinations thereof.

The metal chelate compound, for example, is formed of a metal component such as aluminum, iron, tin, titanium, nickel, etc., and formed with acetylene, ethyl acetate, ethyl lactate. The epoxy compound is, for example, N,N,N',N'-tetraglycidyl metaxylylenediamine or 1,3-bis(N,N'-diglycidylaminomethyl)cyclohexane.

The silane coupling agent suitable for the present adhesive can be selected from at least one of the group consisting of 3-mercaptopropyltrimethoxysilan, 3-glycidoxypropyltrimethoxysilane, and 3-methacryloxypropyltrimethoxysilane, or combinations thereof.

In another aspect of the adhesive of present invention, the adhesive further comprises an addition agent selected from the group consisting of an antistatic agent, an UV absorbent, a low molecular weight polymer, a plasticizer, a filler, a colorant and a pigment, or combinations thereof.

The antistatic agent suitable for the present adhesive may, for example, be an ionic liquid such as an alkali metal salt and/or an organic cation-anion salt. In an aspect of the present invention, the antistatic is, for example, lithium bis-trifluoromethanesulfonimide or tri-n-butyl methylammonium bis-(trifluoromethylsulfonyl)imide, and the amount of the antistatic agent is ranging from 0.05 parts by weight to 0.5 parts by weight relative to per 100 parts by weight of (meth)acrylate polymer.

The present invention will be described below with reference to Examples to describe the present invention in detail but the present invention is not limited to the description thereof.

EXAMPLE

Example 1

84 parts by weight of n-butyl (meth)acrylate (n-BA), 1 parts by weight of 2-hydroxyethyl (meth)acrylate (HEMA), 15 parts by weight of 2-phenoxyethyl (meth)acrylate (PHEA), 200 parts by weight of ethyl acetate (EAC) solvent, 0.1 parts by weight of azobisisobutyronitrile (AIBN), were placed in a four-port reaction vessel, and after replacing the air in the reaction vessel with nitrogen, the mixture was stirred under a nitrogen atmosphere, and the reaction solution was heated to 55° C. for 8 hours.

Next, 100 parts by weight of the above reaction product, 0.1 parts by weight of toluene diisocyanate trimer (DESMODUR IL1451 BA, commercially obtained from Covestro AG), 0.5 parts by weight of metal chelate compound (CA-190T, commercially obtained from I-TAI CHEMICALS) and 1.0 parts by weight of 3-hydrothiopropyltrimethoxydecane were uniformly mixed to prepare an acrylate adhesive solution.

The properties of shear storage modulus, loss tangent and adhesion strength of the acrylate adhesive solution are measured according to the method of measurement described later, and the results are shown in Table 1.

The acrylate adhesive solution was coated on a polyethylene terephthalate (PET) substrate, and then the acrylate adhesive solution was dried at 100° C. for 5 minutes to obtain an acrylate adhesive with a thickness of 5 μm. The acrylate adhesive was transferred to a polyimide film with a thickness of 38 μm and attached to another polyimide film with a thickness of 38 μm to prepare a test sample. The test sample was aged for 5 days at 30° C. for adhesion, static folding storage test and dynamic folding test. The test results are listed in Table 2.

Example 2

84 parts by weight of n-butyl (meth)acrylate (n-BA), 1 parts by weight of 2-hydroxyethyl (meth)acrylate (HEMA), 15 parts by weight of 2-phenoxyethyl (meth)acrylate (PHEA), 200 parts by weight of ethyl acetate (EAC) solvent, 0.1 parts by weight of azobisisobutyronitrile (AIBN), were placed in a four-port reaction vessel, and after replacing the air in the reaction vessel with nitrogen, the mixture was stirred under a nitrogen atmosphere, and the reaction solution was heated to 55° C. for 8 hours.

Next, 100 parts by weight of the above reaction product, 0.15 parts by weight of toluene diisocyanate trimer (DESMODUR IL1451 BA, commercially obtained from Covestro AG) and 1.0 parts by weight of 3-hydrothiopropyltrimethoxydecane were uniformly mixed to prepare an acrylate adhesive solution.

The properties of shear storage modulus, loss tangent and adhesion strength of the acrylate adhesive solution are measured according to the method of measurement described later, and the results are shown in Table 1.

The acrylate adhesive solution was coated on a polyethylene terephthalate (PET) substrate, and then the acrylate adhesive solution was dried at 100° C. for 5 minutes to obtain an acrylate adhesive with a thickness of 5 μm. The acrylate adhesive was transferred to a polyimide film with a thickness of 38·m and attached to another polyimide film with a thickness of 38·m to prepare a test sample. The test sample was aged for 5 days at 30° C. for adhesion, static folding storage test and dynamic folding test. The test results are listed in Table 2.

Example 3

84 parts by weight of n-butyl (meth)acrylate (n-BA), 1 parts by weight of 2-hydroxyethyl (meth)acrylate (HEMA), 15 parts by weight of 2-phenoxyethyl (meth)acrylate (PHEA), 200 parts by weight of ethyl acetate (EAC) solvent, 0.1 parts by weight of azobisisobutyronitrile (AIBN), were placed in a four-port reaction vessel, and after replacing the air in the reaction vessel with nitrogen, the mixture was stirred under a nitrogen atmosphere, and the reaction solution was heated to 55° C. for 8 hours.

Next, 100 parts by weight of the above reaction product, 0.1 parts by weight of toluene diisocyanate trimer (DESMODUR IL1451 BA, commercially obtained from Covestro AG), 0.2 parts by weight of metal chelate compound (CA-190T, commercially obtained from I-TAI CHEMICALS) and 1.0 parts by weight of 3-hydrothiopropyltrimethoxydecane were uniformly mixed to prepare an acrylate adhesive solution.

The properties of shear storage modulus, loss tangent and adhesion strength of the acrylate adhesive solution are measured according to the method of measurement described later, and the results are shown in Table 1.

The acrylate adhesive solution was coated on a polyethylene terephthalate (PET) substrate, and then the acrylate adhesive solution was dried at 100° C. for 5 minutes to obtain an acrylate adhesive with a thickness of 5 μm. The acrylate adhesive was transferred to a polyimide film with a thickness of 38·m and attached to another polyimide film with a thickness of 38·m to prepare a test sample. The test sample was aged for 5 days at 30° C. for adhesion, static folding storage test and dynamic folding test. The test results are listed in Table 2.

Property Measurement

Measurement of Shear Storage Modulus (G') and Loss Tangent (tan δ):

The acrylate adhesive prepared in the foregoing examples was molded into a test sample with a size of 1 cm×0.8 cm and a thickness of 5 mm. The rheological properties of the test sample were measured using a Rheogel-E4000 manufactured by UBM Corporation at frequency of 0.1 Hz and 1 Hz, a temperature ranging of 20° C. to 80° C., and a heating rate of 3° C./min to respectively obtain the shear storage modulus (G') and the loss tangent (tan δ) at 30° C. and 60° C.

Measurement of Adhesion Strength (Peeling Force):

The acrylate adhesive coated on PET substrate was transferred onto a polyimide film, and cut into a strip test piece of 25 mm×150 mm. After the PET substrate on the test piece peeling off, the strip test piece was adhered to a surface of a alkali-free glass with a 2 kg pressure roller, and applied a pressure of about 3 kg/cm² on the strip test piece for 1 minute at 50° C. to prevent bubbles and impurities from being present between the polyimide film and the glass. The strip test piece was standing at a temperature of 23±1° C. and a relative humidity of 50±2% RH for 20 minutes, and then the 180-degree adhesion of the strip test piece to the glass was measured by a tensile machine (Dachang, manufactured by Cometech, Taiwan) at a pulling rate of 300 mm/min.

Static Folding Test:

The two polyimide films laminated with the acrylate adhesive was cut into a test sample with a size of 120 mm×10 mm. The short side of the test sample was fixed with a tape, and the test sample was attached to a folding tester (manufacturer: YUASA SYSTEM CO., LTD Model: DLDM111LHB). The test sample was folded of 180° with a minimum folding curvature radius (R) of 2 mm and a diameter of 4 mm and stored at room temperature (25° C.) for 1/3/5/7 days. After the test was completed, both ends of the test sample were placed on a flat surface, and the curling height of the bent portion was measured and recorded (in mm).

Dynamic Folding Test:

The two polyimide films laminated with the acrylate adhesive was cut into a test sample with a size of 120 mm×10 mm. The short side of the test sample was fixed with a tape, and the test sample was attached to a folding tester (manufacturer: YUASA SYSTEM CO., LTD Model: DLDM111LHB). The test sample was repeated folded of 180° with a minimum folding curvature radius (R) of 2 mm and a diameter of 4 mm for 200000 times. After the test was completed, the test sample was checked whether cracks were generated in the bent portion, and if the cracks did not cause, it was evaluated as (◯), and if the bent portion was cracked, it was evaluated as (x).

TABLE 1 shear storage modulus (G') and loss factor (tan δ) of Examples 1 to 3

| | G'(MPa) | | tan δ | |
|---|---|---|---|---|
| | 60° C./0.1 Hz | 30° C./1 Hz | 60° C./0.1 Hz | 30° C./1 Hz |
| 1 | 0.065 | 0.088 | 0.119 | 0.108 |
| 2 | 0.079 | 0.106 | 0.099 | 0.102 |
| 3 | 0.067 | 0.092 | 0.117 | 0.104 |

TABLE 2 folding properties of the laminated polyimide films of Examples 1 to 3

| Examples | peeling force | Static folding test, R = 2 mm | | | | Dynamic folding test, R = 2 mm |
|---|---|---|---|---|---|---|
| | | 1 day | 3 days | 5 days | 7 days | 200000 times |
| 1 | 647 | 4.2 | 5.4 | 5.2 | 5.5 | ◯ |
| 2 | 682 | 4.2 | 5.4 | 5.3 | 5.5 | ◯ |
| 3 | 665 | 4.6 | 5.9 | 5.8 | 5.7 | ◯ |

From the results of Table 1 and Table 2, the adhesives for the flexible optical film of the present invention exhibit good adhesiveness after static bending test and dynamic bending test without peeling off, and the optical films with the adhesive can also return to a curling value of low deformation, and the curling value is not easy to increase with time, and reveals stable restoring property. Therefore, the adhesive of the present invention can be applied to an electronic product that requires a bending function.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adhesive for a flexible optical film, comprising at least a (meth)acrylate polymer, a hardener, and a silane coupling agent, which is characterized in that:
   (A) a shear storage modulus ($G'_{(60° C./0.1 Hz)}$) measured at the temperature of 60° C. and the frequency of 0.1 Hz and a shear storage modulus ($G'_{(30° C./1 Hz)}$) measured at the temperature of 30° C. and the frequency of 1 Hz satisfy the relation: $(G'_{(60° C./0.1 Hz)} - G'_{(30° C./1 Hz)})/G'_{(30° C./1 Hz)} > -0.29$; and
   (B) a loss tangent ($\tan \delta_{(60° C./0.1 Hz)}$) measured at the temperature of 60° C. and the frequency of 0.1 Hz and a loss tangent ($\tan \delta_{(30° C./1 Hz)}$) measured at the temperature of 30° C. and the frequency of 1 Hz satisfy the relation:

$$(\tan \delta_{(60° C./0.1 Hz)} - \tan \delta_{(30° C./1 Hz)})/\tan \delta_{(30° C./1 Hz)} < 0.2.$$

2. The adhesive according to claim 1, wherein the shear storage modulus ($G'_{(60° C./0.1 Hz)}$) measured at the temperature of 60° C. and the frequency of 0.1 Hz is ranging from 0.05 MPa to and 0.09 MPa, and the shear storage modulus ($G'_{(30° C./1 Hz)}$) measured at the temperature of 30° C. and the frequency of 1 Hz is ranging from 0.07 MPa to 0.15 MPa.

3. The adhesive according to claim 1, wherein the loss tangent ($\tan \delta_{(60° C./0.1 Hz)}$) measured at the temperature of 60° C. and the frequency of 0.1 Hz is ranging from 0.08 to 0.15, and the loss tangent ($\tan \delta_{(30° C./1 Hz)}$) measured at the temperature of 30° C. and the frequency of 1 Hz is ranging from 0.09 to 0.12.

4. The adhesive according to claim 1, wherein the (meth)acrylate polymer includes an alkyl (meth)acrylate, an aromatic (meth)acrylate, and a hydroxyl monomer.

5. The adhesive according to claim 4, wherein the number average molecular weight (Mn) of the (meth)acrylate polymer is ranging between 1,500,000 and 2,500,000, and the glass transition temperature (Tg) is ranging between −30° C. and −35° C.

6. The adhesive according to claim 1, further comprising an addition agent selected from one of the group consisting of an antistatic agent, an UV absorbent, a low molecular weight polymer, a plasticizer, a filler, a colorant and a pigment, or combinations thereof.

\* \* \* \* \*